March 23, 1943.  J. R. RITCHIE  2,314,601
ROAD ROLLER STRUCTURE
Filed March 21, 1942  2 Sheets-Sheet 1
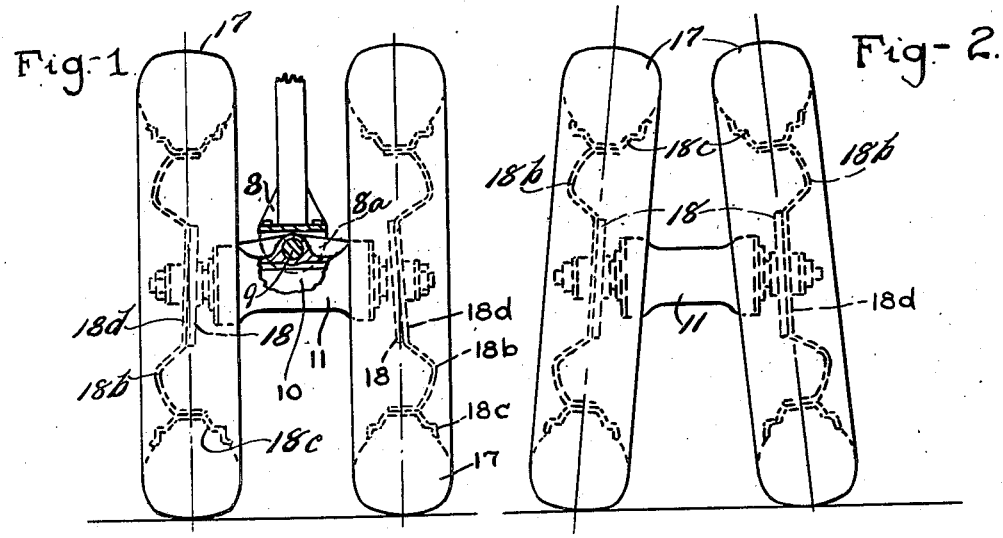
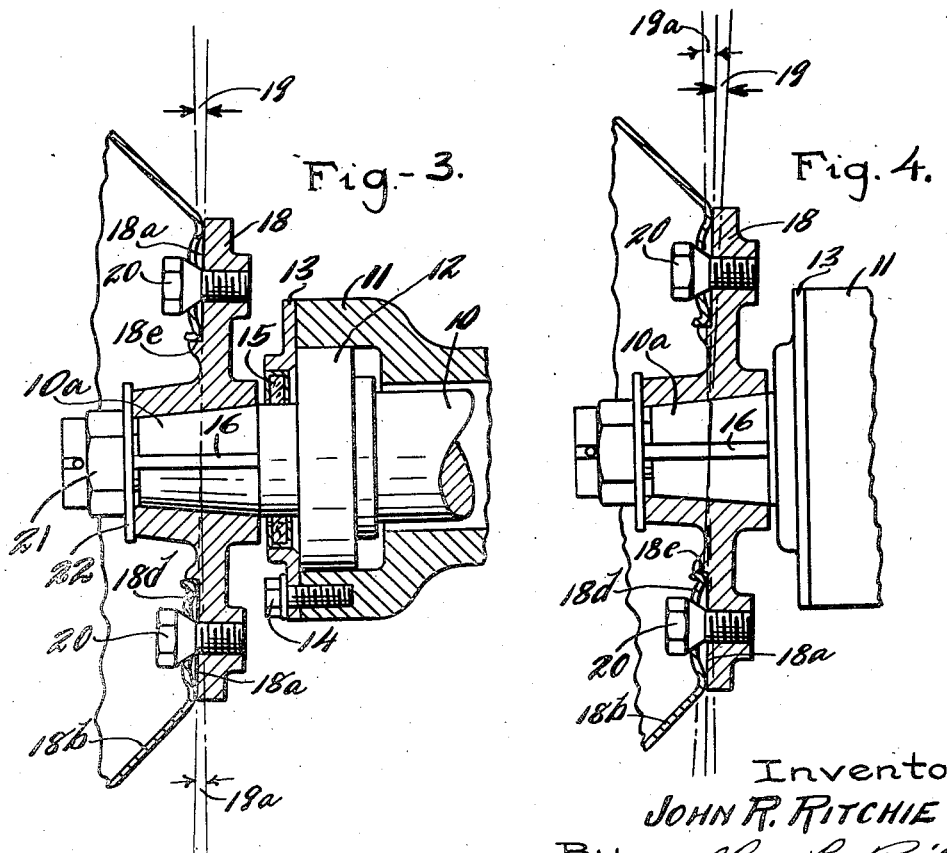
Inventor:
JOHN R. RITCHIE
By Chas. C. Reif
Attorney March 23, 1943.  J. R. RITCHIE  2,314,601
ROAD ROLLER STRUCTURE
Filed March 21, 1942  2 Sheets-Sheet 2

Inventor
JOHN R. RITCHIE
By Chas. E. Reif.
Attorney

Patented Mar. 23, 1943

2,314,601

UNITED STATES PATENT OFFICE 2,314,601

ROAD ROLLER STRUCTURE

John R. Ritchie, Minneapolis, Minn.

Application March 21, 1942, Serial No. 435,650

4 Claims. (Cl. 94—50)

This invention relates to a vehicle and particularly to a vehicle such as a road rolling machine. The invention is illustrated in connection with a road rolling machine of the type illustrated in the patent to Ritchie granted Dec. 17, 1935, No. 2,024,184.

Such road rolling machines are used for compacting the materials used in various kinds of roads in compacting fills and other places. The general arrangement of such a roller is to have wheels equipped with pneumatic tires on two axles, the wheels and tires thereof on the respective axles being in staggered relation. There is a very small strip of the material or road which is sometimes not engaged by the tire and this leaves a small ridge extending longitudinally of the road.

It is an object of this invention to provide a simple and efficient structure for giving a wobble motion to the wheels or tires so that there will be no such ridge remaining after the road roller has passed over the road forming material.

It is a further object of the invention to provide a vehicle such as a road roller having an axle, a wheel secured to said axle having a tire-receiving rim and comprising relatively movable parts provided with portions disposed in planes making a slight angle to a plane perpendicular to the axis of said axle so that said wheel can be disposed with the central plane of the rim at right angles to the axis of the axle or in position making a slight angle to a lane perpendicular to said axis.

It is more specifically an object of the invention to provide a vehicle such as a road roller having an axle, a wheel carrying flange secured to said axle having a surface disposed at a slight angle to a plane perpendicular to the axis of said axle, a rim carrying wheel frame having a flange adapted to engage said wheel-carrying flange, said flange on said wheel frame being disposed in a plane making a slight angle with the central plane of its rim whereby said flanges may be relatively disposed so that the central plane of said rim will be at a slight angle to a plane perpendicular to the axis of the axle or may be perpendicular to said axis.

These and other objects and advantages of the invention will be fully set forth in the following description made in connection with the accompanying drawings in which like reference characters refer to similar parts throughout the several views and in which:

Fig. 1 is a view in side elevation of a wheel and axle embodying the invention with the central plane of the rim or tire of the wheel disposed at right angles to the axis of the axle;

Fig. 2 is a view in side elevation of a pair of wheels and the supporting parts embodying the invention and arranged with the central plane of the rims making an angle to a plane perpendicular to the axis of the axle;

Fig. 3 is a vertical section through the end of the axle and adjacent parts;

Fig. 4 is a view similar to Fig. 3 showing the parts in a different position, Figs. 3 and 4 being shown on an enlarged scale;

Figure 6:
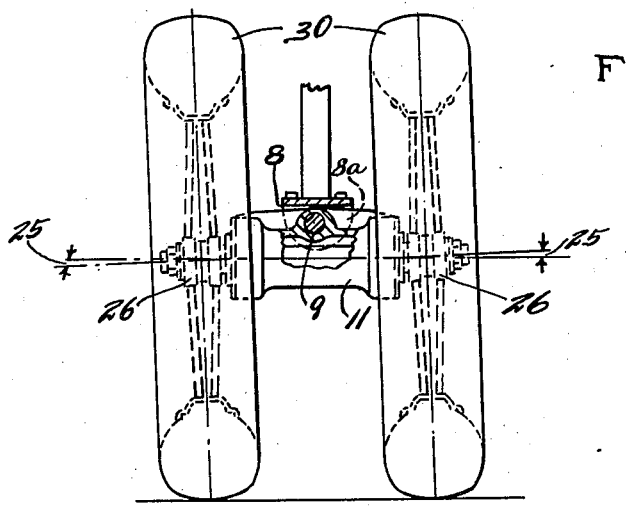
Fig. 6 is a view in side elevation of a pair of wheels provided with the structure shown in Fig. 5.

Referring to the drawings a portion of a vehicle such as a road roller is shown comprising an axle 10. An axle carrying member or housing 11 surrounds the central portion of axle 10 and is provided with bearings 12 of any suitable type such as the well known Timken bearings in which axle 10 is journalled. Housing 11 may be oscillatably mounted about a substantially longitudinal pivot member 9 supported by a lug 8a on the frame 8 of the roller. Housing 11 is shown as provided with a cap 13 secured in place by headed screws 14 and a dust washer 15 is carried in cap 13 and surrounds axle 10. Axle 10 is illustrated as having a tapered portion 10a to which is secured by a suitable key 16 the hub portion of a wheel or wheel carrying member 18. Member 18 is provided with a flange having an annular outer surface 18a and this surface is disposed in a plane making a slight angle with a plane perpendicular to the axis of axle 10. This angle 19 is indicated in Figs. 3 and 4 and while it may be varied as desired, in practice the same has been made of about one degree. A nut 21 illustrated as of the castle type, is secured in the threaded end of axle 10, the same engaging a washer 22 disposed against the end of member 18. Another portion of the wheel or wheel frame 18b is provided, which portion carries the usual rim 18c. Rim 18c is provided with a pneumatic tire 17. Portion 18b has an inner flange 18d, the inside plane of which is disposed at an angle to the central plane of the rim 18c. While said latter angle which is designated 19a may be varied, in practice it has been found convenient to have it of the same size or substantially the same size as the angle 19. Flange 18d is shown as having a slightly out-turned portion at its inner diameter which engages a shoulder 18e formed on member 18.

With the described structure the frame 18b can be arranged relatively to member 18 or the surface 18a so that the central plane of the rim 18c will be at right angles to the axis of axle 10. With this arrangement the flanges 18 and 18d are arranged with their greatest divergence at opposite sides of the axle or at 180 degrees from each other. With this arrangement the inclination of surface 18a offsets the inclination of flange 18d so that the central plane of rim 18c is perpendicular to the axis of axle 10. When flange 18d is disposed relatively to flange 18 or the surface 18a thereof so that the greatest divergence of said flanges is at the same side of the axle the central plane of rim 18c will be disposed at an angle to a plane perpendicular to the axis of axle 10 equal to the sum of the angle 19 and the angle 19a which flange 18d makes with the central plane of rim 18c. The latter arrangement is illustrated in Fig. 2. It will be seen that by rotating flange 18d to different positions on surface 18a the angle which the central plane of the rim makes with a plane perpendicular to the axis of the axle can be varied. With the wheels arranged as shown in Fig. 2, when the vehicle progresses and axle 10 and the wheels rotate the wheels will have a wobble motion so that they will cross the track of the wheel which has made a track therebetween. With this wobble motion any small longitudinally extending ridges will be eliminated.

Figure 5:
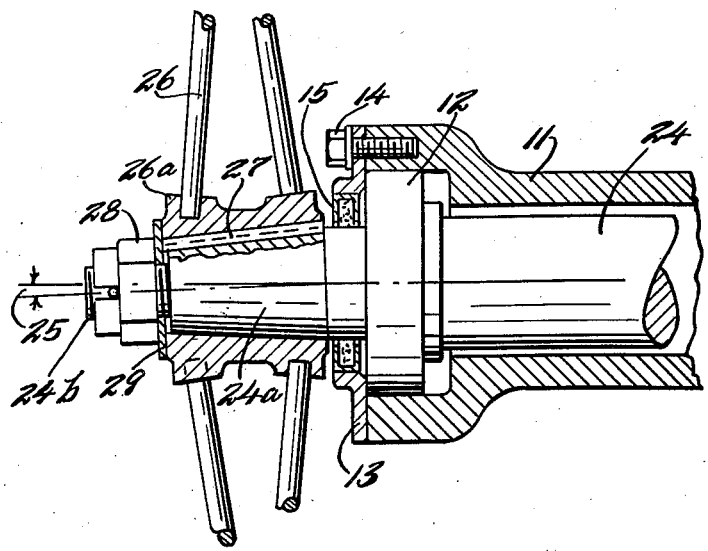
Fig. 5 is a view similar to Fig. 3 showing a modification.

In Figs. 5 and 6 a modification is shown in which the housing 11 carries the bearing 12 as already described in which bearings the axle 24 is journalled. Housing 11 is shown as having the cap 13 and washer 15, said cap being held in place by the screws 14. Axle 24 has the end portion 24a which is tapered outwardly and this portion has its axis extending at a slight angle to the axis of axle 24. This angle 25 may be varied but in practice it would be made substantially two degrees. A wheel 26 having the hub 26a is secured to axle portion 24a by one or more keys 27. Axle portion 24a has an outer reduced threaded portion 24b on which is threaded a nut 28 illustrated as of the castle type. Washer 29 engages the end of hub 26a and is held thereagainst by the nut 28. In Fig. 5 a pair of wheels 26 are shown equipped with pneumatic tires 30. Both ends of axle 24 are shown and the portions 24a thereof incline in opposite directions from the axis of said axle. The portion 24a at the left end of said axle inclines downwardly while the portion 24a at the right is shown as inclining upwardly. Housing 11 is shown as mounted in the manner shown in Fig. 1.

With the structure shown in Figs. 5 and 6 it will be seen that when the vehicle is progressed and the wheels 26 rotate with axle 24 that said wheels will have a wobble motion. The tires 30 will thus make tracks which will overlap somewhat the track made by the tire aligned with a space therebetween. The formation of small ridges when the roller rolls over the surface will thus be eliminated.

From the above description it will be seen that I have provided a simple and efficient structure of a vehicle such as a road rolling machine in which the position of the wheels can be varied as desired. The structure is simple, easily made and very durable. It will be obvious that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A road roller having in combination, an axle, a wheel-carrying member secured to said axle, said member being provided with a flange having a surface disposed in a plane at a slight angle to a plane perpendicular to the axis of said axle, a rim-carrying wheel frame engaging said flange and means for securing said flange and frame together whereby the central plane of said rim is disposed at a slight angle to a plane perpendicular to the axis of said axle.

2. A road roller having in combination, an axle, a wheel-carrying member secured to said axle, said member being provided with a flange having a surface disposed in a plane at a slight angle to a plane perpendicular to the axis of said axle and a rim-carrying wheel frame having a flange engaging the flange on said member and said flange on said frame being disposed in a plane at a slight angle to the central plane of said rim.

3. A road roller having in combination, an axle, a wheel-carrying member secured to said axle, said member being provided with a flange having a surface engaging disposed in a plane at a slight angle to a plane perpendicular to the axis of said axle and a rim-carrying wheel frame having a flange engaging said flange on said member, said flange on said frame being disposed in a plane at a slight angle to the central plane of said rim, said first mentioned slight angle being substantially the same as said second mentioned slight angle.

4. A road roller having in combination, an axle, a rim-carrying wheel frame secured to said axle, said frame comprising relatively movable parts having relatively rotatable engaging portions disposed in planes making a slight angle to a plane perpendicular to the axis of said axle whereby said parts can be relatively rotated and positioned so that said wheel can be arranged to have the central plane of said rim at right angles to said axis or at an angle thereto.

JOHN R. RITCHIE.